(12) United States Patent
Schenk et al.

(10) Patent No.: US 8,693,878 B2
(45) Date of Patent: Apr. 8, 2014

(54) ILLUMINATION DEVICE AND METHOD FOR EMBEDDING A DATA SIGNAL IN A LUMINANCE OUTPUT USING AC DRIVEN LIGHT SOURCES

(75) Inventors: Tim C. W. Schenk, Eindhoven (NL); Lorenzo Feri, Eindhoven (NL); Peter Deixler, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 209 days.

(21) Appl. No.: 13/131,884

(22) PCT Filed: Nov. 27, 2009

(86) PCT No.: PCT/IB2009/055377
§ 371 (c)(1),
(2), (4) Date: May 31, 2011

(87) PCT Pub. No.: WO2010/064175
PCT Pub. Date: Jun. 10, 2010

(65) Prior Publication Data
US 2011/0236034 A1    Sep. 29, 2011

(30) Foreign Application Priority Data

Dec. 4, 2008 (EP) .................................... 08170709

(51) Int. Cl.
*H04B 10/00* (2013.01)
*H04B 10/04* (2011.01)
*H04B 10/12* (2011.01)
*H05B 37/00* (2006.01)
*H04B 10/50* (2013.01)
*H04B 10/114* (2013.01)
*H04B 10/112* (2013.01)

(52) U.S. Cl.
CPC ............ *H04B 10/505* (2013.01); *H04B 10/504* (2013.01); *H04B 10/1149* (2013.01); *H04B 10/1125* (2013.01); *H04B 10/1143* (2013.01)
USPC ............ 398/130; 398/201; 398/172; 398/183

(58) Field of Classification Search
CPC ............... H04B 10/505; H04B 10/504; H04B 10/1125; H04B 10/1143
USPC ......... 398/172, 201, 118–119, 128, 130, 209, 398/213; 315/291, 307, 294, 312, 185 R, 315/193, 360, 308
See application file for complete search history.

(56) References Cited

U.S. PATENT DOCUMENTS 4,484,190 A * 11/1984 Bedard .................. 340/12.1
5,307,194 A * 4/1994 Hatton et al. ............. 398/130
(Continued)

FOREIGN PATENT DOCUMENTS

EP    1564914 A1    8/2005
WO   2008060469 A2  5/2008

*Primary Examiner* — Ken Vanderpuye
*Assistant Examiner* — Abbas H. Alagheband
(74) *Attorney, Agent, or Firm* — Mark L. Beloborodov

(57) ABSTRACT

The invention relates to an illumination device connectable to an AC voltage source for applying an alternating voltage during a series of time intervals. The illumination device comprises at least a first light source and a second light source, arranged to be connected in series to the AC voltage source, to generate a luminance output in response to the alternating voltage. Selection means are provided configured for selectively applying the alternating voltage over the first light source or the first and second light source. A controller is provided for controlling the selection means in response to a data signal comprising data symbols such that one or more of the data symbols are contained in said luminance output. The invention also relates to a method of embedding one or more data symbols in the luminance output of such an illumination device, an optical receiver and an illumination system.

20 Claims, 6 Drawing Sheets

(56) References Cited

U.S. PATENT DOCUMENTS

| | | | |
|---|---|---|---|
| 5,657,145 A * | 8/1997 | Smith | 398/172 |
| 6,597,485 B1 * | 7/2003 | Ikeuchi et al. | 398/192 |
| 7,560,677 B2 * | 7/2009 | Lyons et al. | 250/205 |
| 7,583,901 B2 * | 9/2009 | Nakagawa et al. | 398/183 |
| 7,689,130 B2 * | 3/2010 | Ashdown | 398/172 |
| 7,986,107 B2 * | 7/2011 | Weaver et al. | 315/291 |
| 8,207,691 B2 * | 6/2012 | Slot et al. | 315/360 |
| 8,384,307 B2 * | 2/2013 | Grajcar | 315/307 |
| 8,531,128 B2 * | 9/2013 | Weaver et al. | 315/291 |
| 2002/0126360 A1 * | 9/2002 | Tokita | 359/180 |
| 2003/0122502 A1 * | 7/2003 | Clauberg et al. | 315/291 |
| 2004/0051692 A1 * | 3/2004 | Hirakata et al. | 345/102 |
| 2004/0101312 A1 * | 5/2004 | Cabrera | 398/172 |
| 2005/0162101 A1 * | 7/2005 | Leong et al. | 315/291 |
| 2005/0213353 A1 * | 9/2005 | Lys | 363/17 |
| 2006/0056855 A1 * | 3/2006 | Nakagawa et al. | 398/183 |
| 2006/0175985 A1 * | 8/2006 | Huynh et al. | 315/312 |
| 2006/0239689 A1 * | 10/2006 | Ashdown | 398/130 |
| 2006/0273985 A1 * | 12/2006 | Sun et al. | 345/46 |
| 2006/0275040 A1 * | 12/2006 | Franklin | 398/172 |
| 2008/0122376 A1 * | 5/2008 | Lys | 315/192 |
| 2008/0224025 A1 * | 9/2008 | Lyons et al. | 250/205 |
| 2009/0123161 A1 * | 5/2009 | Sun et al. | 398/182 |
| 2009/0226176 A1 * | 9/2009 | Franklin | 398/115 |
| 2010/0109557 A1 * | 5/2010 | Bouchard | 315/294 |
| 2010/0171145 A1 * | 7/2010 | Morgan et al. | 257/99 |

* cited by examiner

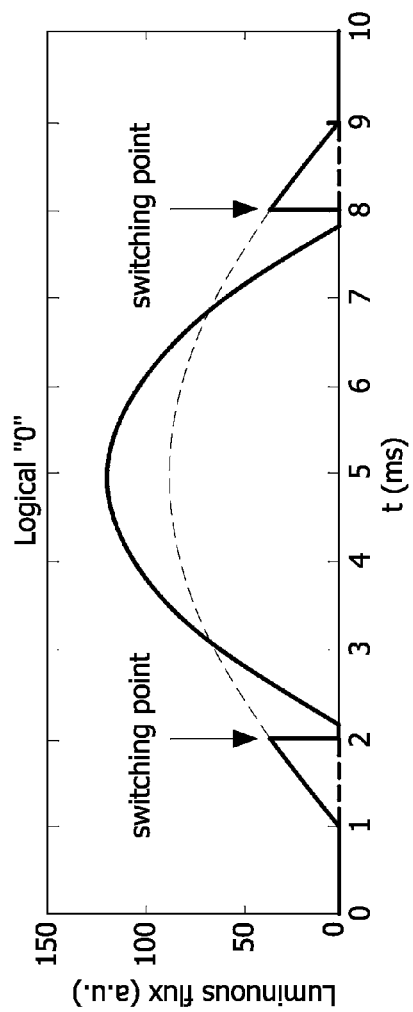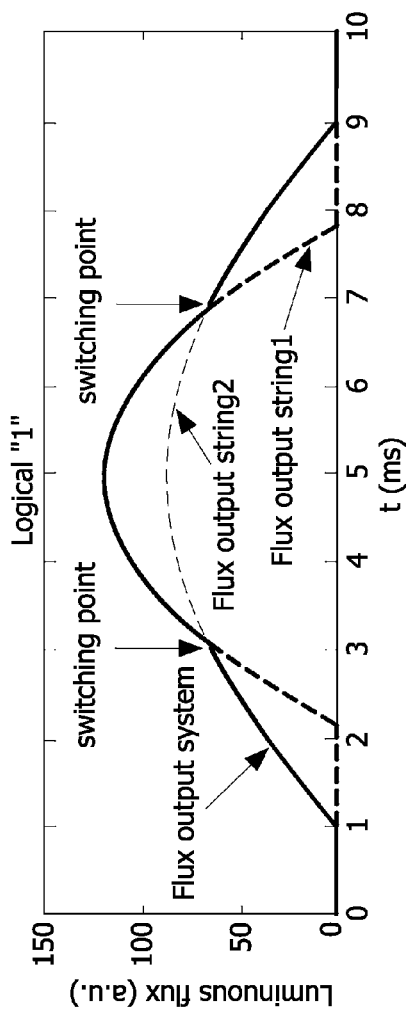

ILLUMINATION DEVICE AND METHOD FOR EMBEDDING A DATA SIGNAL IN A LUMINANCE OUTPUT USING AC DRIVEN LIGHT SOURCES

FIELD OF THE INVENTION

The invention relates to the field of illumination devices, optical receivers, illumination systems and methods and, more specifically, to devices, systems and methods for embedding data in the luminance output of such illumination devices.

BACKGROUND OF THE INVENTION

In recent years, highly advanced illumination systems are being developed in order to enable consumers to obtain a desired ambiance for a particular room or space.

An example of such an illumination system is an arrangement of several illumination devices in a structure, such as a room, a lobby or a vehicle. The illumination devices, which may comprise light emitting diodes, emit visible light that carries codes (series of data symbols), i.e. coded light, identifying a light source or group of light sources. The light source codes are transmitted by modulating the luminance output from the illumination device. In such an illumination system, an optical receiver for receiving the codes is e.g. implemented in a remote control device for controlling the illumination devices or embedded in another device such as a switch or a sensor device.

Coded light also has advantages for mass-market illumination devices to perform e.g. fine tuning of the light sources and it allows embedding of individual information in the luminance output, representative of e.g. temperature or other status information.

Mass-market illumination devices may have a direct connection between an AC power source and the light sources. Such illumination devices typically do not contain an electrical driver. It is considered that such illumination devices should pave the road and generate a market for more advanced illumination systems.

Illumination devices wherein light sources are directly connected to an AC source have disadvantages when compared to DC-driven light sources (although these latter are more expensive), such as a lower efficacy and the production of some visible flicker resulting from the AC modulation frequency.

US 2006/175985 discloses a method and circuit for driving light emitting diodes (LEDs) in multiphase. A string of LEDs divided into groups connected to each other in series is provided. Each group is coupled to ground through separate conductive paths. A phase switch is provided in each conductive path. Increasing the input voltage turns on the string of LEDs, group by group in the sequence downstream the string.

An illumination device comprising such a circuit can be used to switch on/off respective (groups of) LEDs to obtain maximum luminance output as will be explained in more detail in the detailed description of the drawings.

A problem of such an AC-driven illumination device is that, while luminance output can be optimized, it fails to enable embedding of data symbols (codes) in the luminance output.

SUMMARY OF THE INVENTION

It is an object of the invention to provide an AC driven illumination device, an illumination system and a method capable of embedding data symbols in the luminance output. It is also an object to provide an optical receiver capable of receiving and processing luminance output containing embedded data.

An illumination device connectable to an AC voltage source for applying an alternating voltage during a series of time intervals is disclosed. The illumination device comprises at least a first light source and a second light source, arranged to be connected in series to the AC voltage source, to generate a luminance output in response to the alternating voltage. Selection means are provided that are configured for selectively applying the alternating voltage over the first light source or the first and second light source. A controller is provided for controlling the selection means in response to a data signal comprising data symbols such that one or more of the data symbols are contained in the luminance output.

Moreover, a method of embedding one or more data symbols of a data signal in a luminance output of an illumination device is disclosed. The illumination device is connected to an AC voltage source for applying an alternating voltage during a series of time intervals. The illumination device comprises at least a first light source and a second light source, connected in series to the AC voltage source, for generating a luminance output in response to the alternating voltage. The alternating voltage is selectively applied over the first light source or the first and second light source in response to the data signal such that one or more of the data symbols are embedded in the luminance output during a time interval.

By selectively controlling the selection means, e.g. a switch, during a time interval the first light source or both the first and second light source can be controlled to emit light. The point in time during the time interval at which a switch occurs is referred to as the switching point. Data symbols are embedded in the luminance output of the illumination device by making the selective control dependent on the data symbols to be embedded, i.e. to modulate the switching point(s).

It should be noted that binary modulation of the switching point is not necessary. Other types of modulation have been envisaged as well, including analogue modulation (with an amplitude modulated control signal) and digital modulation (comprising multiple levels). A switching point may, for example, have four positions that allow two bits to be included in the luminance output during a time interval.

It should also be noted that the disclosed illumination device is not necessarily applied for the purpose of illumination but may also be applied for data communication as such. As an example, the illumination device may constitute an access point to a network.

Claims 2 and 14 define specific embodiments according to the invention to enable data symbols to be included in the luminance output. The controller controls the variation of the switching point in time between light emission from the first light source and light emission from both the first and second light sources, and thus determines the duration of the first and second parts of the time interval.

The embodiments of the invention as defined in claims 3, 4 and 15 allow for differences in the switching point between time intervals while embedding identical data symbols. This dynamic variation of the switching point may e.g. be applied in a situation wherein an optical receiver moves with respect to the illumination device and the receiver requires the data to be embedded at higher luminance outputs for appropriate detection of the data signal.

The embodiment of the invention as defined in claim 5 allows for the use of a simple optical receiver capable of detecting variations in the luminance output between two time intervals.

The embodiment of the invention as defined in claim 6 provides the advantage of a substantially constant integrated optical power for successive time intervals and thus avoids substantial visual flickering in the luminance output between successive time intervals.

The embodiments of claims 7 and 8 allow for higher data rates within a time interval. The embodiment of claim 7 provides further light sources and thus further switching points that can be modulated to embed data symbols in the luminance output. The embodiment of claim 8 provides for repeated selection of the first respectively the first and second light sources within a time interval.

The embodiment of claim 9 provides small form factor light sources for the illumination device.

In order to enable retrieving the data symbols from the luminance output of the illumination device, an optical receiver is required. The optical receiver comprises an optical detector configured for detecting the luminance output containing the data symbols. The optical receiver may further comprise at least one of an integrator and a memory. The integrator is configured for obtaining optical power from the detected luminance output for each of the two time intervals. The memory may store information indicative of a switching point between the first part and the second part during a time interval.

The optical receiver also includes a processor. In case the optical power for different data symbols is substantially equal, such as for the embodiment of claim 6, the processor may be configured to compare only corresponding parts of two time intervals to retrieve data symbols. Whereas the optical power for the entire time intervals may be substantially equal, parts of the intervals may show different optical power. Data symbols may also be retrieved by comparison of the detected switching points with stored switching points.

The embodiment of the invention as defined in claim 12 allows for determining further data from the light sources, such as the light intensity received from an illumination device.

Finally, an illumination system comprising the illumination device and a remote control accommodating such an optical receiver are proposed.

Hereinafter, an embodiments of the invention will be described in further detail. It should be appreciated, however, that these embodiments may not be construed as limiting the scope of protection for the present invention.

BRIEF DESCRIPTION OF THE DRAWINGS

In the drawings:

FIGS. 4A and 4B provide luminance output characteristics resulting from a first exemplary method of operating the illumination device of FIG. 3 for embedding data symbols;

DETAILED DESCRIPTION OF THE DRAWINGS

Figure 1:
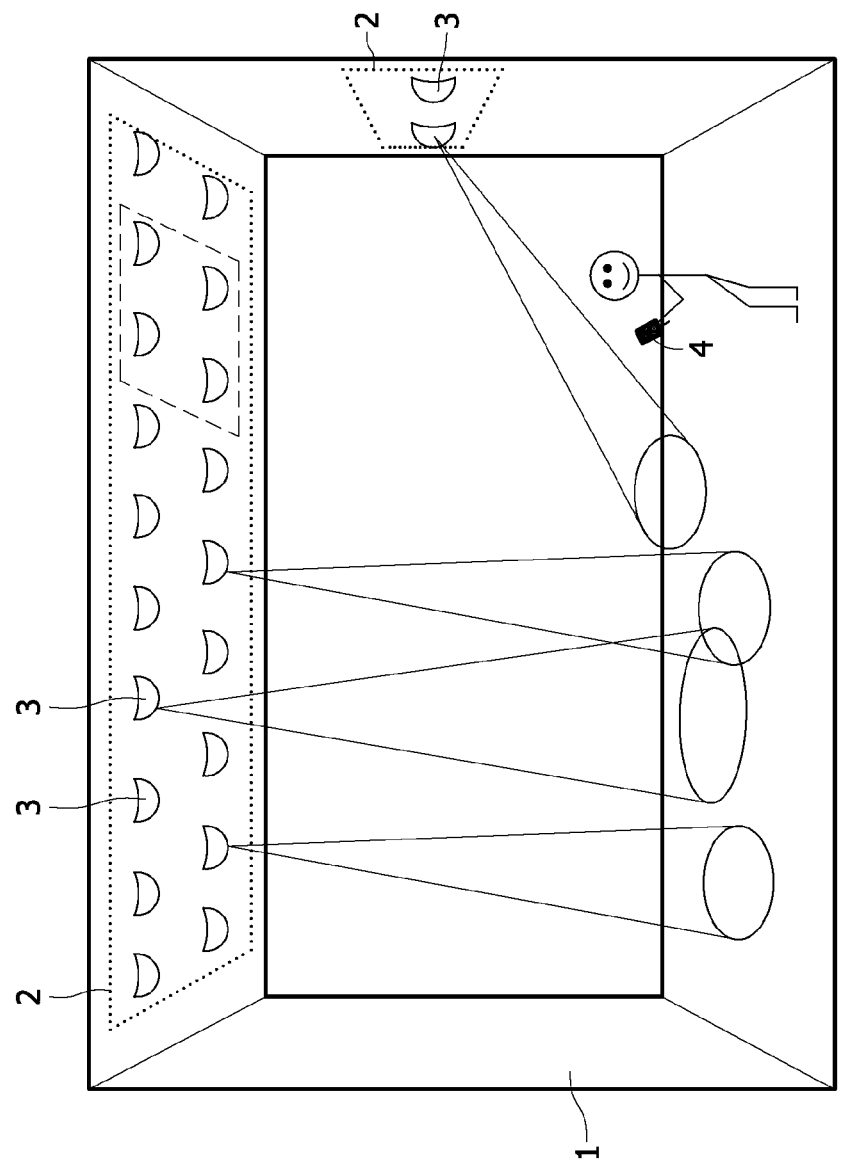
FIG. 1 is a schematic illustration of an illumination system installed in a structure according to an embodiment of the invention.

FIG. 1 shows a structure 1—in this case a room—with an installed illumination system 2. The illumination system 2 comprises a plurality of illumination devices 3. The illumination devices 3 may comprise high/low pressure gas discharge sources, inorganic/organic light emitting diodes, or laser diodes. The illumination system 2 may further comprise a remote control 4 allowing a user to control the illumination devices 3.

Figure 2A:
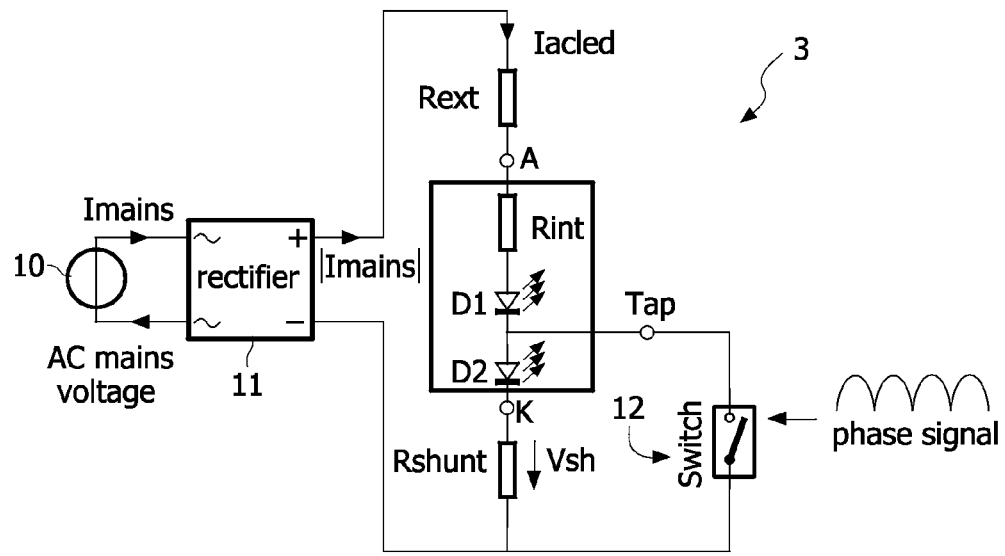
FIGS. 2A and 2B provide a circuit diagram and a voltage/luminance characteristic for AC-driven light sources.

FIG. 2A provides a circuit diagram of an illumination device 3 connected to an AC voltage source 10 arranged in series with a first light emitting diode (LED) D1 and a second light emitting diode D2. LEDs D1 and D2 emit a luminous output upon application of a voltage over these LEDS. LEDs D1 and D2 may represent groups of LEDs. Apart from various resistances, Rext, Rint and Rshunt, the circuit comprises a rectifier 11 and a selecting means 12, embodied as a switch. The switch 12 is arranged such that it enables shorting the second LED D2 in a closed state of the switch. In the embodiment of FIG. 2A, this is done by providing a tap point between the LEDs D1 and D2.

Figure 2B:
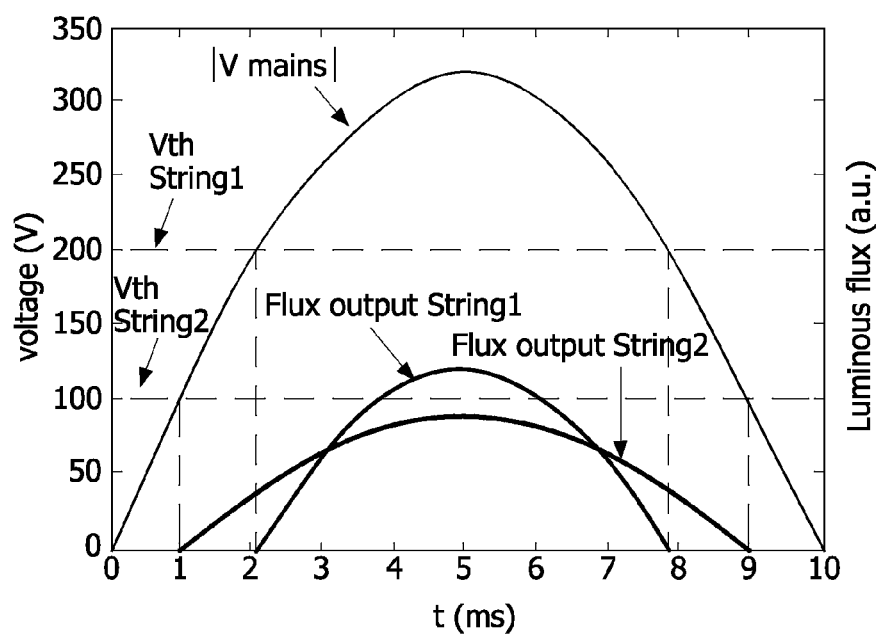

FIG. 2B illustrates the alternating voltage Vmains (left-hand vertical axis) supplied by the AC voltage source 10 to the LEDs D1 and D2 for a single time interval. It is assumed that the LEDs D1 and D2 have a threshold voltage Vth of 100 Volts. Consequently, if switch 12 is open, the voltage is applied to both LEDs D1 and D2 (in series; referred to as string 1 in FIG. 2B), and a luminance output (right-hand vertical axis) will be obtained only during the period when the alternating voltage exceeds 200 Volts. The luminance output is, in other words, only obtained between 2 and 8 ms for a time interval of 0-10 ms. If switch 12 is closed, the alternating voltage is applied only to LED D1 (string 2 in FIG. 2B) and current will be running through LED D1 at an alternating voltage of 100 Volts and higher. Consequently, the luminance output of LED D1 will start earlier in the time interval and extinguish later than for string 1, as shown in FIG. 2B. The maximum luminance output is lower than for string 1, since string 2 has fewer LEDs.

The luminance output of the illumination device 3 can be optimized by switching from string 2 to string 1 at an appropriate point in time, hereinafter also referred to as the switching point, using selection means 12. The switching points in FIG. 2B are defined such that the complete string (string 1) is selected when the luminance output of this string exceeds the luminance output of only a part of the string (string 2). In FIG. 2B, the switching points are defined at 3 and 7 ms. The phase signal indicated in FIG. 2A provides a control signal for defining the switching points by operating the selection means 12 and can for instance be related to the input voltage.

Figure 3:
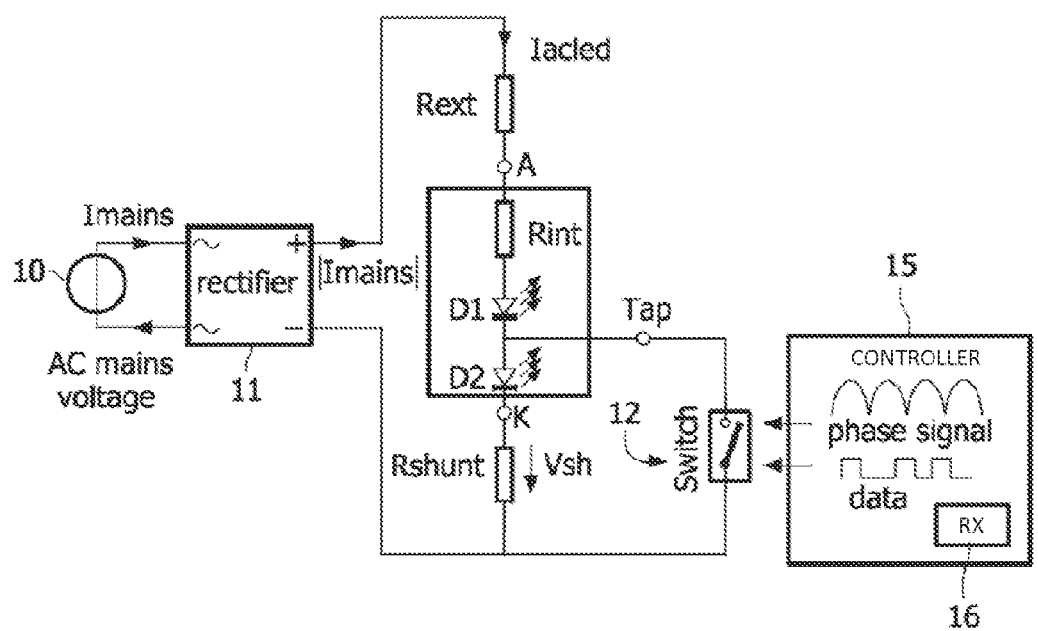
FIG. 3 provides a circuit diagram for an illumination device according to an embodiment of the invention.

In an embodiment of the invention, a controller 15 is provided for the illumination device 3 to manipulate the switching points as compared to the embodiment of FIGS. 2A and 2B, as schematically illustrated in FIG. 3. In particular, the phase signal for manipulating the switch 12 is modulated by a data signal comprising data symbols that are to be embedded in the luminance output of LEDs D1 and D2. Controller 15 may comprise a receiver 16 for receiving external commands and to manipulate the data signal in response to such a command. Receiver 16 may also be used for feeding the data signal to the controller 15.

The data symbols may represent various data, such as identification codes or information concerning (the status of) a particular illumination device. Identifiers may comprise Code Division Multiple Access (CDMA) identifiers uniquely identifying illumination devices 3 in a local environment. Other schemes are also possible, e.g. where illumination devices 3 generate a random identifier of e.g. 24 bits. As long as the length of the identifier is long enough, the probability of two illumination devices using the same identifier is negligibly small.

It should be noted that illumination source 3 may also be a part of a data communication system, e.g. a wireless access point.

Generally, the data signal will be a binary signal containing only two data symbols "0" and "1" (bits).

FIGS. 4A and 4B illustrate a first embodiment of embedding data symbols "0" and "1", respectively, in the luminance output of LEDs D1 and D2, represented on the vertical axis for a single time interval (the horizontal axis) using the illumination device of FIG. 3 in a switching phase mode. The solid curves represent the actual luminance output from the illumination device 3, whereas the dashed extrapolated curves illustrate the luminance outputs of the first and second string if switching had not been performed. Clearly, to embed a logical "0" in the luminance output, the controller 15 controls switch 12 such that the alternating voltage is applied to LED D1 during a first part (between 1 and 2 ms) of the time interval and to LEDs D1 and D2 during a second part of the time interval (between 2 and 8 ms), as illustrated in FIG. 4A. Consequently, a sudden dip in the luminance output is obtained at the switching point as a result of the increased threshold voltage of LEDs D1 and D2 provided in series. Another switching point is defined by the data signal at 8 ms, where a sudden rise of the luminance output is obtained. These switching points define a logical "0" in the luminance output of the illumination device 3.

FIG. 4B illustrates the luminous output of illumination device 3 when a logical "1" should be embedded. In this situation, controller 15 controls switch 12 such that switching points are provided as 3 ms and 7 ms (as opposed to 2 ms and 8 ms for a logical "0" data symbol. Actually, the solid luminance curve in FIG. 4B represents the maximum luminance output for the illumination device 3.

It should be appreciated that, of course, the luminous output of FIG. 4A may be assigned to a logical "1" data symbol and the luminous output of FIG. 4B may be assigned to a logical "0" data symbol.

The luminous output characteristics illustrated in FIGS. 4A and 4B using the switching phase mode for illumination device 3 of FIG. 3 possess different integrated optical power and may therefore be detected easily in an optical receiver.

A data signal will typically comprise a plurality of data symbols, such that an illumination device 3 will generate a plurality of luminance outputs as displayed in FIGS. 4A and 4B during successive time intervals. When a logical "0" is followed by a logical "1" during a subsequent time interval, or vice versa, the integrated optical power of the luminance output varies for successive time intervals. The different optical power for a logical "0" and a logical "1" may sometimes be experienced visually as flickering of the light.

To reduce this flicker effect, the optical power differences between data symbols of the data signal should preferably kept small. In an embodiment of the invention, this can be achieved by having controller 15 control switch 12 in a bi-phase mode, the luminance output of which is illustrated in FIGS. 5A and 5B.

Figure 5A:
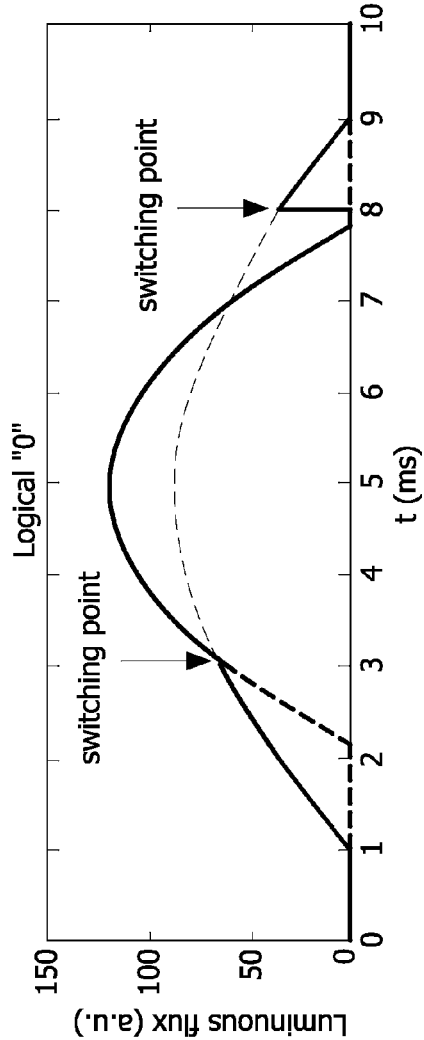
FIGS. 5A and 5B provide luminance output characteristics resulting from a second exemplary method of operating the illumination device of FIG. 3 for embedding data symbols.

In FIG. 5A, a logical "0" is embedded in the luminance output of illumination device 3 by controller 15 by closing switch 12 at 3 ms and by opening switch 12 at 8 ms during a time interval. On the other hand, as shown in FIG. 5B, a logical "1" is obtained by closing switch 12 at 2 ms and opening switch 12 again at 7 ms during a corresponding time interval. By comparing the luminance outputs of FIGS. 5A and 5B, it can be observed that the integrated optical power is substantially identical for a logical "0" and a logical "1" and, consequently, flickering is reduced.

Figure 5B:
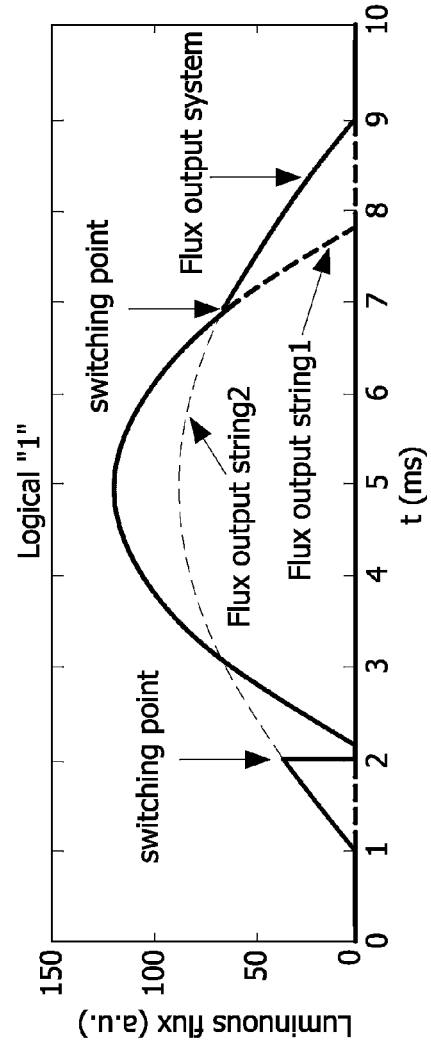

Again, it should be appreciated that the luminous output of FIG. 5A may be assigned to a logical "1" data symbol and the luminous output of FIG. 5B may be assigned to a logical "0" data symbol.

It is noted that the differences in luminance output between a logical "0" and logical "1" have been exaggerated in the above embodiments for reasons of clarity.

While the embodiments of FIGS. 4A, 4B and FIGS. 5A, 5B show advantageous embodiments of the invention, it should be appreciated that many further embodiments exist within the scope of the present invention.

As an example, in the above embodiments, controller 15 operates switch 12 twice within a time interval. However, while being detrimental for the integrated optical power for a particular time interval, it is possible that the switch 12 is operated once during a time interval. It is also possible to modulate the left and right part of the luminance output separately to double the data rate. A first bit is then represented in the first switching point and a second bit in the second switching point. As an example, for first bit switching at 2 ms represents a "0" and switching at 3 ms represents a "1". For the second bit, switching at 7 ms represents a "0" and switching at 8 ms represents a "1". It is also possible that switch 12 is operated three or more times during a time interval by controller 12 in order to embed more data symbols in the luminance output during a time interval.

In the above embodiments, controller 15 controls switch 12 such that the switching points are located where the luminance output of a part of the series of LEDs D1, D2 is higher than for the complete series arrangement (in the intervals 1-3 ms and 7-9 ms in the above Figures). However, it may be advantageous to provide switching points near the middle of the time interval in order to increase the switching frequency and to accordingly reduce electromagnetic interference.

From FIGS. 4A, 4B and 5A, 5B it may be suggested that a logical "0" and a logical "1" are represented always by the same luminance output characteristic and/or the same switching point(s). However, this is not necessarily the case. Controller 15 may control switch 12 such that the luminance output characteristic and/or the switching point(s) is(are) dynamically varied between time intervals while embedding the same data symbol(s). As an example, the logical "0" represented in the luminance output of FIG. 4A has switching points at 2 and 8 ms for a first time interval but may have switching points at 4 and 6 ms for a later time interval.

The embodiment of the illumination device 3 as depicted in FIG. 3 comprises only two LEDs D1, D2 in series. It is noted that more than two LEDs can be arranged in series, wherein one or more switches 12 are arranged such that the alternating voltage can be applied selectively over one or more LEDs as controlled by controller 15. This enables embedding of multiple data symbols in the luminance output of the illumination device 3 within a time interval. Moreover, illumination device 3 may comprise several parallel branches with LEDs connected in series.

Figure 6:
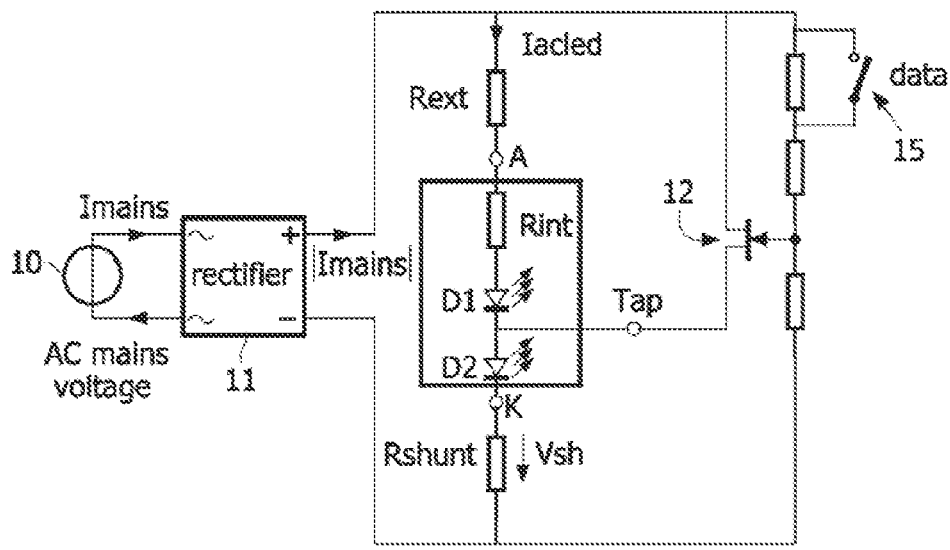
FIG. 6 is an exemplary embodiment of an illumination device.

The modulation of the switching points may be embedded as a small piece of digital logic, e.g. a part of a microprocessor of a digital ASIC. An embodiment is schematically illustrated in FIG. 6, enabling that the switch does not need to switch high currents.

Figure 7:
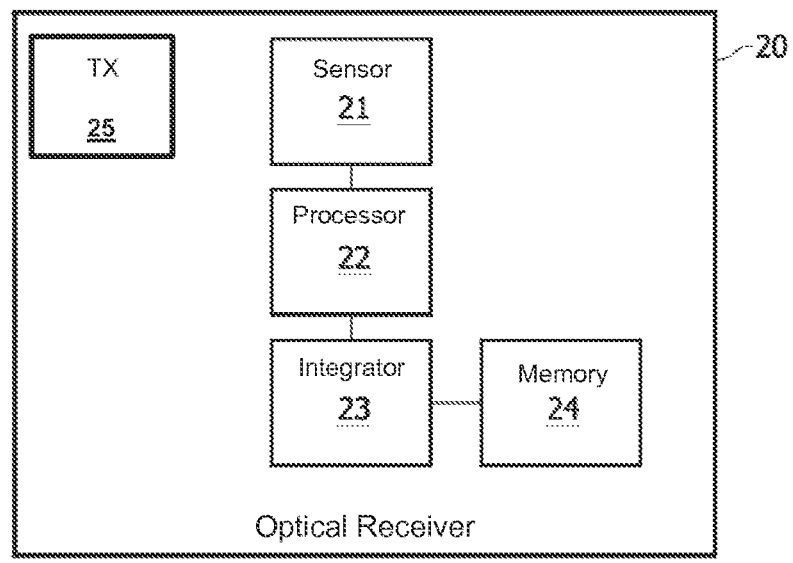
FIG. 7 provides a schematic illustration of an optical receiver according to an embodiment of the invention.

In order to enable retrieving the data symbols from the luminance output of the illumination device, an optical receiver 20 may be used as schematically illustrated in FIG. 7. The optical receiver 20 comprises an optical detector/sensor 21 configured for detecting the luminance output of the illumination device 3 containing the data symbols. Optical receiver 20 also comprises a processor 22.

The optical receiver 20 may further comprise at least one of an integrator 23 and a memory 24. The integrator 23 is configured for obtaining optical power from the detected luminance output for each time interval to recognize as "0" or a "1" data symbol.

In case the optical power for different data symbols is substantially equal, as for the embodiment of FIGS. 5A and 5B, the processor 22 may be configured to compare only corresponding parts of two time intervals to retrieve data symbols, e.g. the time interval parts between 1-4 ms. Whereas the optical power for the entire time interval of 0-10 ms is substantially equal, such parts of the intervals may have different optical power.

The memory 24 may store information indicative of a switching point in the luminance output. Data symbols may be retrieved by comparison of the detected switching points with stored switching points.

Of course, memory 24 may also have stored (parts of) the luminance characteristic for one or more data symbols for recognizing a data symbol. The characteristics can be used for filtering the luminance output and to deduce the data symbol from the filtered result. The luminance characteristics may also be used for determining further data from the light sources, such as the light intensity, light colour, or colour temperature from the light received from an illumination device 3.

The optical receiver 20 may be part of a device, such as remote control 4 in FIG. 1. Remote control 4 or optical receiver 20 may comprise means 25 for transmitting commands to receiver 16 of illumination device 3. As an example, remote control 4 may detect that the distance between the remote control and an illumination device 3 increases and subsequently command illumination device 3 to shift the switching points to higher luminance outputs in order to continue appropriate reception of the data symbols.

The invention claimed is:

1. An illumination device connectable to an AC voltage source for applying an alternating voltage during a series of time intervals, the illumination device comprising:
   at least a first light source and a second light source, arranged in series to said AC voltage source to generate a luminance output in response to said alternating voltage;
   a selection device configured to selectively apply said alternating voltage across a selected one of: (1) said first light source, and (2) a series combination of said first light source and second light source; and
   a controller configured for controlling said selection device in response to a data signal comprising data symbols such that one or more of said data symbols are contained in said luminance output.

2. The illumination device of claim 1, wherein said selection device is configured to apply said alternating voltage over said first light source but not said second light source during at least a first part of one of said time intervals and for applying said alternating voltage over the series combination of said first light source and second light source during a second part of said one of said time intervals, wherein said controller is configured for varying the duration of said first part and said second part between at least two time intervals of said series of time intervals.

3. The illumination device according to claim 2, wherein said data signal is a binary signal comprising first and second data symbols and wherein said controller is adapted to dynamically vary said duration of said first and second part for conveying said data symbols of said binary signal in said luminance output between said two time intervals.

4. The illumination device according to claim 3, further comprising a receiver, said receiver being connected to said controller and being configured for receiving command signals for dynamically varying said duration.

5. The illumination device according to claim 2, wherein said controller is configured for varying the duration of said first part and second part between a first of said two time intervals and a second of said two time intervals such that said luminance output of said illumination device differs between said first and second of said two time intervals for different data symbols.

6. The illumination device according to claim 2, wherein said controller is configured for varying the duration of said first part and second part between a first of said two time intervals and a second of said two time intervals such that said luminance output of said illumination device remains substantially constant between said first and second of said two time intervals for different data symbols.

7. The illumination device according to claim 1, further comprising at least a third light source connected in series to said first and second light sources to contribute to said luminance output in response to said alternating voltage, wherein said selection device is further configured for selectively applying said alternating voltage over said third light source and wherein said controller is configured for controlling said selection device to selectively apply said alternating voltage over said third light source in response to said data signal.

8. The illumination device according to claim 1, wherein said controller is configured for controlling said selection device for selectively applying said alternating voltage to said first light source and the series combination of said first light source and second light source such that said alternating voltage is applied over said first light source but not the second light source during two or more of non-contiguous parts of a single time interval.

9. The illumination device according to claim 1, wherein said first and second light source comprise light emitting diodes.

10. An illumination system comprising one or more illumination devices according to claim 1 and a remote control device for controlling said one or more illumination devices, said remote control device comprising
   at least one optical receiver;
   an optical detector configured for detecting said luminance output containing said data symbols; and at least one of:
   an integrator for obtaining optical power from said detected luminance output for each of said two time intervals; and
   a memory storing at least information indicative of a switching point between said first part and said second part during said one time interval;
   wherein the optical receiver further comprises a processor configured for obtaining said data symbols from optical power differences from said integrator on the basis of corresponding parts of said two time intervals or from a comparison of said detected luminance output with said stored information.

11. The illumination system according to claim 10, wherein said data signal is a binary signal comprising first and second symbols and wherein said memory further comprises at least one luminance output profile during said one time interval representing at least one of said first and second symbols.

12. A method of embedding one or more data symbols of a data signal in a luminance output of an illumination device connectable to an AC voltage source for applying an alternating voltage during a series of time intervals, the illumination device comprising at least a first light source and a second light source, connected in series to said AC voltage source, to generate said luminance output in response to said alternating voltage, the method comprising the step of selectively applying said alternating voltage over said first light source, or a series combination of said first light source and second light source, in response to said data signal such that one or more of said data symbols are embedded in said luminance output.

13. The method according to claim 12, comprising the steps of:
applying said alternating voltage over said first light source but not said second light source during at least a first part of one of said time intervals;
applying said alternating voltage over the series combination of said first light source and second light source during a second part of said one of said time intervals;
varying the duration of said first part and said second part of said time intervals between at least two time intervals of said series of time intervals to embed said data signal.

14. The method according to claim 13, wherein said illumination device further comprises a receiver and said data signal is a signal comprising first and second data symbols, the method further comprising the steps of;
receiving a command signal at said receiver;
dynamically varying said duration of said first and second part conveying said data symbols of said signal between said two time intervals.

15. The illumination device of claim 1, wherein the controller is configured for controlling said selection device in response to the data signal comprising the data symbols such that one or more of said data symbols are embedded in said luminance output within each of at least a plurality of successive time intervals among the series of time intervals.

16. The illumination device of claim 15, wherein the time intervals are each one half a period of the AC voltage.

17. The illumination system of claim 10, wherein the remote control device comprises the integrator for obtaining optical power from said detected luminance output for each of said two time intervals, wherein the optical receiver further comprises the processor configured for obtaining said data symbols from optical power differences from said integrator on the basis of corresponding parts of said two time intervals.

18. The illumination system of claim 10, wherein the remote control device comprises the memory storing at least information indicative of the switching point between said first part and said second part during said one time interval, wherein the optical receiver further comprises the processor configured for obtaining said data symbols from the comparison of said detected luminance output with said stored information.

19. The method of claim 12, wherein one or more of said data symbols are embedded in said luminance output within each of at least a plurality of successive time intervals among the series of time intervals.

20. The method of claim 19, wherein the time intervals are each one half a period of the AC voltage.

* * * * *